United States Patent [19]
Koistinen et al.

[11] Patent Number: 6,154,778
[45] Date of Patent: Nov. 28, 2000

[54] UTILITY-BASED MULTI-CATEGORY QUALITY-OF-SERVICE NEGOTIATION IN DISTRIBUTED SYSTEMS

[75] Inventors: Jari Koistinen, Palo Alto; Aparna Seetharaman, Redwood City; Evan R. Kirshenbaum, Mountain View, all of Calif.

[73] Assignee: Hewlett-Packard Company, Palo Alto, Calif.

[21] Appl. No.: 09/081,265

[22] Filed: May 19, 1998

[51] Int. Cl.⁷ .............................. G06F 13/00; G06F 15/16; H04Q 11/00

[52] U.S. Cl. .......................... 709/228; 709/227; 709/240; 709/239; 370/230; 370/395

[58] Field of Search ..................................... 709/228, 203, 709/227, 240, 241, 223, 224, 239; 370/395, 409, 230, 465

[56] References Cited

U.S. PATENT DOCUMENTS

| | | | |
|---|---|---|---|
| 5,065,393 | 11/1991 | Sibbitt et al. .............................. | 70/58.2 |
| 5,408,465 | 4/1995 | Gusella et al. .............................. | 370/17 |
| 5,491,797 | 2/1996 | Thompson et al. ...................... | 709/200 |
| 5,644,715 | 7/1997 | Baugher .............................. | 395/200.04 |
| 5,674,003 | 10/1997 | Andersen et al. ................... | 364/514 R |
| 5,732,078 | 3/1998 | Arango ..................................... | 370/355 |
| 5,802,058 | 8/1999 | Harris et al. .............................. | 370/410 |
| 5,832,197 | 11/1998 | Houji .......................................... | 714/4 |
| 5,892,754 | 4/1999 | Kompella et al. ....................... | 370/236 |
| 5,898,668 | 4/1999 | Shaffer ..................................... | 370/230 |
| 5,946,311 | 8/1999 | Alexander, Jr. et al. ................ | 370/395 |
| 5,948,069 | 9/1999 | Kitai et al. ............................... | 709/240 |
| 5,995,490 | 11/1999 | Shaffer et al. ........................... | 370/260 |

*Primary Examiner*—Glenton B. Burgess
*Assistant Examiner*—Abdullahi E. Salad

[57] ABSTRACT

In a distributed system, a method and system for negotiating a multi-category Quality-of-Service (QoS) agreement between a client and a server includes a client agent enabled to calculate an expected utility to a client of multiple multi-category QoS specifications. The client agent obtains the QoS specifications by transmitting a QoS specification request to a server agent or a broker. The expected utility calculation, based on a probabilistic estimate of QoS levels included in the QoS specifications, enables the client agent to distinguish the QoS specifications of greater value from those of lesser value. The client agent selects at least one of the QoS specifications to be included into an offer for a QoS agreement based on the expected utility calculation. In a preferred embodiment, the client agent selects the QoS specifications determined to be most valuable to the client. The offer is transmitted to the server agent to request a service provided by a server at QoS levels represented by the selected QoS specifications. After transmitting the offer, the client monitors a connection to the server agent for either an acceptance, a rejection, or a counteroffer to the offer. Communication between the client agent and the server agent conforms to a negotiation protocol which provides a set of rules for transmission of negotiation messages.

19 Claims, 12 Drawing Sheets

UTILITY-BASED MULTI-CATEGORY QUALITY-OF-SERVICE NEGOTIATION IN DISTRIBUTED SYSTEMS

TECHNICAL FIELD

The present invention relates generally to a system and method for negotiating a quality-of-service agreement between a client and a server, and more particularly, the invention relates to systems and methods for enabling utility-based multi-category quality-of-service negotiation in distributed systems.

DESCRIPTION OF THE RELATED ART

The term Quality-of-Service (QoS) can be used to describe various non-functional characteristics associated with the operation of communication networks. Enterprises are increasingly dependent on the effectiveness of distributed systems in the daily operation of their businesses. The effectiveness of these distributed systems is in large part dependent on efficient allocation of limited available resources, which can be accomplished through negotiation of QoS agreements. These distributed systems are frequently employed in open network environments, such as the Internet, that have constantly varying levels of QoS. Increasingly mobile workers perform their work from many different connection points and expect applications to handle the varying levels of QoS which are required under different circumstances.

A user of a foreign exchange trading system might access the trading system using a laptop computer at multiple connection points which include a remote dial-up connection and a connection on a local area network (LAN) supporting a server which provides the trading services. The QoS requirements of the user and the capability of the connection to support particular QoS levels can change depending on the connection point of the user. For example, due to geographic proximity, the user's requirement for security will be relatively low when connected directly to the LAN supporting the server as compared to the need for security when connected via the dial-up connection. The dial-up connection might not be able to support as high a performance level as the direct connection on the LAN. Furthermore, resource availability at the same connection point can fluctuate, thereby impacting the user's preferred or required QoS levels with regard to performance and security.

Most existing QoS negotiation protocols are focused on multi-media applications and deal only with a restricted number of QoS parameters. Furthermore, most of these protocols regard negotiation as a process of reserving resources. U.S. Pat. No. 5,674,003 to Andersen et al. describes a computer video conferencing system which employs a socket based transport interface between remote computers over a connection oriented telephony network. A number of sockets are formed into a group and a QoS is associated with the socket group. If a new socket group is established which significantly affects the QoS requirements of the original socket group, a new QoS agreement can be negotiated. The negotiation consists of comparing a QoS requested for use by the new socket group to the QoS available for a telephony connection to the desired endpoint. If the available QoS matches the requested QoS, then the telephony connection is completed. If the available and requested QoS do not match, then a determination is made whether the available QoS is nevertheless acceptable to the socket group. If the available QoS is acceptable, the connection is completed.

Although the Andersen et al. system and method provide a solution to the problem of additional QoS requirements incurred during a call, the system and method is limited to a threshold based negotiation method in which a QoS offer must meet the minimum requirements of a user device in order to be accepted. The method does not enable intelligent selection of a QoS offer from multiple acceptable offers.

U.S. Pat. No. 5,644,715 to Baugher describes a multimedia computer system for scheduling and coordinating multimedia resources. Data structures store user inputs defining scheduling information necessary to support sessions with a specific QoS. In a negotiation for a QoS for a particular session, QoS parameters are specified by a transport user when a connection is requested. If the transport layer immediately recognizes that the values specified by the QoS are not achievable, the communication attempt fails. Alternatively, the transport layer can recognize that it cannot achieve the desired QoS, but it can achieve a lower satisfactory QoS. The lower QoS, minimum acceptable QoS, and maximum acceptable QoS are then transmitted to the transport user as part of a QoS offer. If the user cannot accept the proposed lower QoS, but can accept a value above the minimum or below the maximum, the user may propose an agreement based on some intermediate QoS level. Although the Baugher reference describes a negotiation method for an acceptable QoS when the desired QoS cannot be achieved, the reference does not describe a method by which a server can transmit multiple offers to a client in addition to the maximum and the minimum QoS value offers. The described method does not provide for intelligent selection by the client from among multiple acceptable QoS options.

Furthermore, both the Andersen et al. and the Baugher patents describe a multimedia centric QoS negotiation method which is not compatible with requirements of non-multimedia QoS negotiation.

What is required is a method and a system for efficiently meeting QoS requirements in open networks wherein resource allocation and load vary substantially.

SUMMARY OF THE INVENTION

In a distributed system, a method and system for negotiating a multi-category client-server QoS agreement includes a client enabled to calculate the expected utility of each of a number of multi-category QoS specifications. The QoS specifications are representative of a probabilistic estimate of QoS levels available via a server. The client obtains the QoS specifications in response to transmitting a QoS specification request to the server or a broker. The expected utility calculations enable the client to distinguish the QoS specifications of greater value from those of lesser value. The client selects at least one of the multi-category QoS specifications to be included into an offer for the QoS agreement, based on the expected utility calculations. In a preferred embodiment, the client selects the QoS specifications determined to have the highest expected utility. The offer is transmitted to the server to request a service provided by the server at QoS levels represented by the selected QoS specification(s). After transmitting the offer, the client monitors the connection to the server for either an acceptance, a rejection, or a counteroffer to the offer. Communication between the client and the server during the QoS negotiation conforms to a negotiation protocol which provides a set of rules for the transmission of negotiation messages.

In a preferred embodiment, a set of utility functions is utilized to calculate the expected utility of each QoS specification. The categories of each multi-category QoS specification include dimensions which represent qualitative or quantitative attributes of a category. For instance, a category of reliability includes the dimensions of availability and mean-time-to-failure. Each dimension of each category in a QoS specification has associated with it a dimension utility function which calculates an expected utility of the dimension. The expected utility for individual dimensions are then combined according to a category utility function to obtain an expected utility for a category.

A preferred embodiment includes a determination of whether the expected utility of each QoS specification satisfies a preselected minimum expected utility threshold. If a particular QoS specification expected utility value does not satisfy the minimum threshold, that specification is not considered for inclusion into an offer for a QoS agreement.

Conformance checking is used for determining whether a particular QoS specification will be considered for inclusion into a QoS offer. Conformance checking involves referencing a constraint profile which defines constraints or requirements which must be met if a QoS agreement is to be reached. If the particular QoS specification does not satisfy the requirements, a utility calculation is not performed on that QoS specification.

To enable application-system transparency, applications associated with the server are enabled to generate preliminary QoS specifications. The preliminary QoS specifications do not reflect the capability of resources to support particular QoS levels because requiring the server applications to possess such detailed low level information would create a substantial burden on the applications. The application-generated preliminary QoS specifications are then filtered to modify the dimension values according to capabilities of resources of the distributed system to support QoS levels. Filtering a preliminary QoS specification can generate multiple QoS specifications.

The calculation of expected utility can include filtering the data included in the QoS specification utilizing a client trust filter which modifies data in the QoS specification according to a level of trust the client possesses with regard to the server. The trust level can be based on the server's performance under previous QoS agreements with the client. Alternatively, the client can access server trustworthiness data from a reputation broker. The broker can be configured to assemble server trustworthiness data by either collecting the data from clients or by entering into QoS agreements with the server to determine how closely the server's actual behavior corresponds to its promised behavior.

The server can be equipped with a server trust filter to process offers from the client to determine whether to accept the offers. Each QoS specification, in addition to containing a server promise to provide a service at certain QoS levels, also includes a corresponding client promise to conform client behavior to certain server requirements. The server trust filter modifies the promise by the client to behave according to the server requirements to reflect the behavior which the server actually expects. Accordingly, the server might reject an offer which, if the stated promises for client behavior were believed, the server would accept. The server can access trust data regarding the client based on the extent to which the terms of previous QoS agreements negotiated by the client have been satisfactorily executed. The data can be collected by the server or it can be accessed from a reputation broker.

The client utilizes an expected default provision function in the calculation of the expected utility for dimensions which are not referenced in QoS specifications. The expected default provision function provides a probabilistic estimate of server QoS behavior with regard to a dimension absent from a QoS specification. The server utilizes an expected default interaction function to provide a probabilistic estimate of client behavior for an aspect of client behavior of interest to the server which is absent from a client behavior mode. The expected default provision functions can be based on past QoS behavior of the server with regard to particular dimensions, the identity of the server, and the server's guarantees. Likewise, the expected defaullt interaction function can be based on past client behavior, client identity and/or client preferences.

The server preferably employs a handler class to determine whether system components are capable of supporting QoS levels specified for those dimensions based on commitments previously assigned to the components. The server invokes the handler class to determine whether to accept a particular offer. Even though the server has filtered the preliminary application-generated QoS specification to generally reflect the capabilities of the system components to support specific QoS levels, the previously assigned commitments, which are not taken into account in the filtering process, might prevent the components from supporting the modified QoS levels.

The present invention provides the advantage of an application-independent generic negotiation protocol. That is, the negotiation protocol is not limited to multi-media applications or any other type of application. Another advantage lies in the efficient allocation of system resources resulting from a QoS agreement narrowly tailored to server capabilities and client requirements. Yet another advantage is that applications are enabled to offer a service in multiple QoS modes. Another advantage is that the invention provides application-system transparency by allowing applications to generate QoS specifications independently of the environment and system in which they operate.

DETAILED DESCRIPTION

Figure 1:
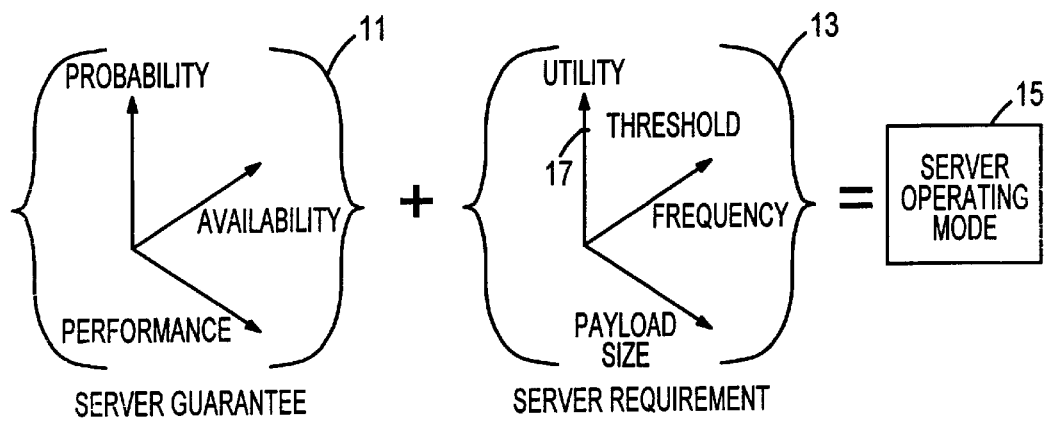
FIG. 1 is a schematic representation of a server guarantee and a server requirement which comprise a server operating mode in a utility-based embodiment of the present invention.

Referring to FIG. 1, a utility-based embodiment of the multi-category QoS negotiation includes a server operating mode 15 which includes a server guarantee 11 and a server requirement 13, which essentially is a utility function. The server guarantee 11 expresses QoS levels in the form of a probability distribution. In FIG. 1 the server guarantee 11 is represented as a graph, correlating dimension values for server availability and server performance to probability values. Although two dimensions are described in FIG. 1, the number of dimensions included in a server guarantee can vary depending on the capabilities and requirements of the server. The server guarantee 11 is a probabilistic estimate of QoS levels at which the server can provide a particular service. The probabilistic estimate of the server's QoS behavior in the guarantee 11 is not necessarily expressable as a linear combination of the probabilistic estimates of multiple dimensions if the guarantee references multiple dimensions. For instance, the combination availability of greater than 95% and a performance of 200 Kbps might correspond to a probability of 87%. In other words, there is an 87% likelihood that the server will be available for more than 95% of calls made by a client when providing a service at a rate of 200 Kbps. However, the server guarantee 11 is conditional on client behavior conforming to certain requirements represented in the server requirement 13.

The server requirement 13 correlates client behavior to utility values for the server and can be combined with a probability distribution of a client behavior mode to calculate an expected utility of a client operating mode. Because client behavior in a client operating mode is expressed in probabilistic terms, the server requirement produces an expected utility of the client operating mode which is expressed in probabilistic terms. In FIG. 1 the requirement function 13 correlates frequency of client calls and payload size of packets transmitted by the client to expected utility to the server. Although two aspects of client behavior are included in the server requirement in FIG. 1, more or fewer aspects may be included. The server requirement 13 may include a threshold 17 which must be satisfied if the server's estimated QoS behavior is to be considered a guarantee. Specifically, the combination of client call frequency and the payload size must satisfy the expected utility threshold The server requirement 13 is not necessarily monotonic with regard to a particular client behavior attribute. For instance, within a range of call frequency between one call per hour and twenty calls per hour, the expected utility does not necessarily only increase or only decrease. The expected utility might decrease between one and seven calls per hour, increase between seven and twelve calls per hour, and decrease again between thirteen and twenty calls per hour.

Figure 2:
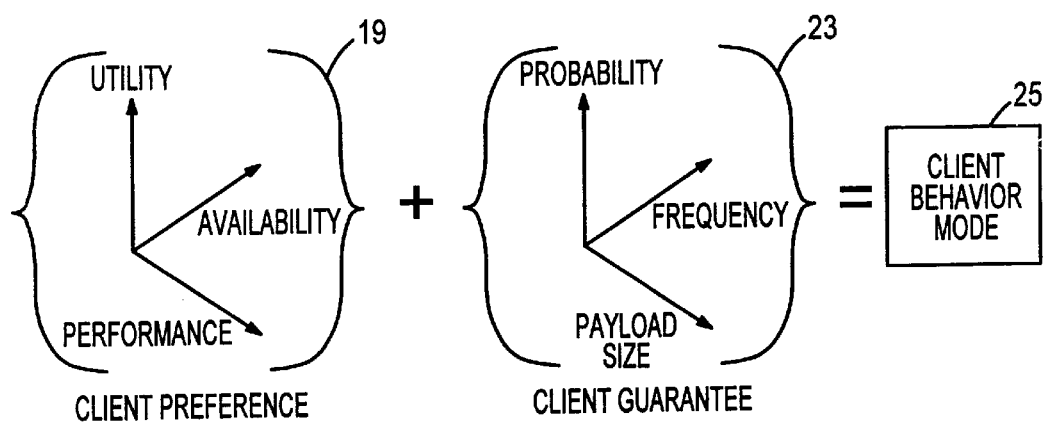
FIG. 2 is a schematic representation of a client preference and a client guarantee which comprise a client behavior mode in the utility-based embodiment.

With reference to FIG. 2, a client behavior mode 25 includes a client preference 19 and a client guarantee 23. The client preference 19 correlates dimension values of a service provided by a server to an utility values to the client. The client preference 19 is not necessarily monotonic with regard to any particular dimension. Furthermore, the client preference 19 might calculate expected utility in a non-independent manner with respect to the dimensions of the server guarantee 11. The client preference 19 can be combined with the server guarantee to provide an expected utility to the client for the server guarantee.

The client behavior mode 25 further includes a client guarantee 23 which expresses client behavior in terms of a probability distribution. In FIG. 2, the client guarantee correlates client call frequency and payload size to probability values. Although the client guarantee 23 in FIG. 2 includes two client behaviors, the client guarantee can include fewer or more than two behaviors. The server requirement 13 can be utilized to determine an expected utility to the server of the client guarantee 23.

The server operating mode 15 might be one of multiple server operating modes which represent different QoS levels at which a server can provide a particular service. The server operating modes collectively can be viewed as an invitation to clients to negotiate a QoS agreement. Essentially, the server operating modes communicate to clients that the server is willing to provide a service at particular QoS levels according to probability distributions on the condition that client behavior satisfies minimum expected utility thresholds as expressed by server requirements. The client behavior mode 25 might be one of multiple client behavior modes which represent client behavior to which the client is willing to conform.

Figure 3:
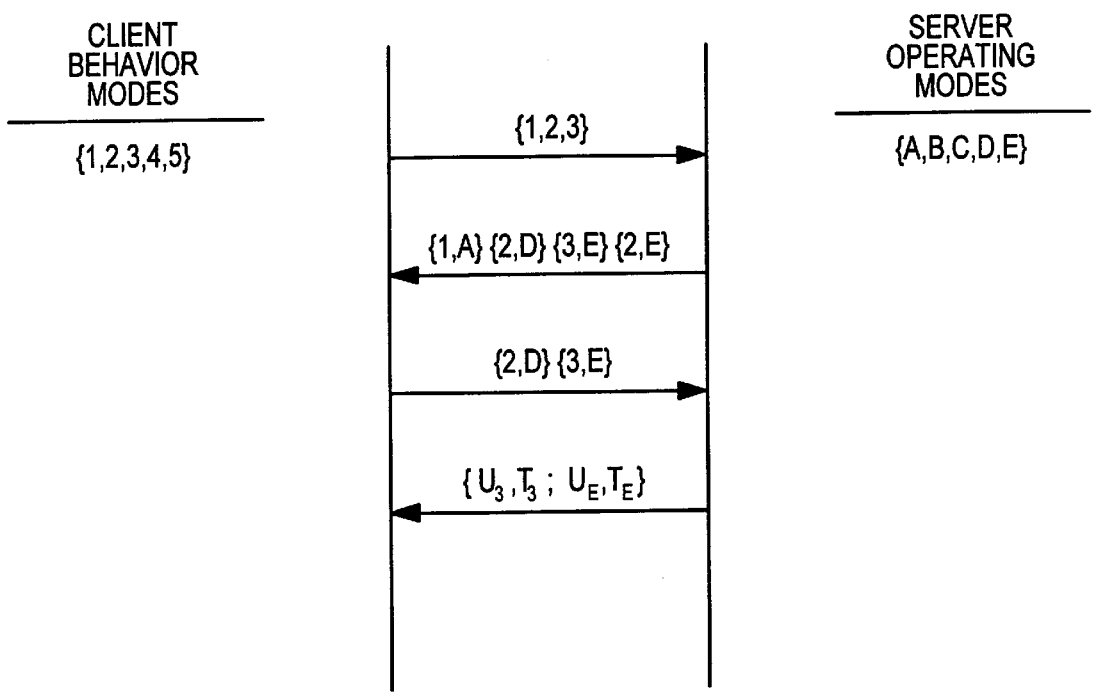
FIG. 3 illustrates an exchange of server operating modes and client behavior profiles shown in FIGS. 1 and 2 during a QoS negotiation.

Referring to FIG. 3, a simplified example of a utility-based negotiation for a multi-category QoS agreement between a server and a client includes a set of client behavior modes {1,2,3,4,5} and a set of server operating modes {A,B,C,D,E}. In a preferred embodiment, the client behavior mode set is included in a client agent which negotiates on behalf of a client with a server agent. The server agent includes the server operating mode set and negotiates with the client agent on behalf of the server. In an alternative embodiment, the client and server negotiate the QoS agreement themselves. In a first transmission to a server agent (not shown), a client agent (not shown) transmits a subset {1,2,3} of the set of client behavior modes {1,2,3,4,5} in a request for offers from the server agent. In an alternative embodiment, the client agent transmits the request to a broker which handles the offer on behalf of the server agent. The server might provide a broker with server operating modes which the broker advertises on behalf of the server. The selection of the client behavior modes might be based on a behavior mode preference function which represents the client's behavior preference. The request for offers does not necessarily include behavior modes, but in a preferred embodiment the behavior modes are included so that the server agent can select a subset of operating modes based on the behavior modes to be included in a set of offers {1,A}, {2,D}, {3,E} and {2E}, which are transmitted to the client agent. In FIG. 3, each offer includes a behavior mode and an operating mode. However, a server requirement is not necessarily included in the server operating mode which the server includes in each offer. Furthermore, if the client agent does not transmit the behavior modes in the offer request, the offer set might consist solely of server guarantees. The server agent can determine which operating modes to include in the offers based on the minimum expected utility thresholds of the server operating modes.

If the client agent includes the behavior modes in the request for offers, the behavior modes might include the client preference if it is assumed that the client agent and server agent negotiate in an environment of trust. Trust implies that the stated values in the server guarantee are the values the server intends to abide by, and the stated values in the client guarantee are the values the client intends to abide by. Including the client preference enables the server to select only those operating modes which will satisfy the client's requirements, thereby expediting the negotiation process. Even in the absence of trust, the behavior modes in the request might include the client preference. However, as will be discussed further below, the server will pass the utility function through a trust function.

If the client agent does not include the client preference 19 in the request for offers, the client agent utilizes the client preferences to calculate an expected utility of the offers and the client agent performs a ranking of the offers. The client agent might utilize a global utility threshold which the client agent utilizes to determine if any offer exceeds a minimum expected utility. The client agent preferably selects a subset of the offers which represent the offers with the highest expected utility to the client. Alternatively, the client agent might simply select the first n offers which exceed the minimum threshold, with n being some positive integer. In FIG. 3, the client agent selects offers {2,D} and {3,E} to transmit to the server agent as offers for a multi-category QoS agreement. Upon receiving the client-selected offers {2,D} and {3,E}, the server agent ranks the offers and selects the offer which is most desirable to the server. The ranking can be based on the expected utility of the client behavior modes included in the offers. The server can also utilize an operating mode preference function which represents the server's preference for choosing a particular operating mode. If the server agent accepts an offer, the server agent transmits an acceptance message $\{U_3, T_3; U_E, T_E\}$ which indicates acceptance of the offer {3,E}. The agreement is expressed in terms of the client preference ($U_3, T_3$) and the server requiremtnt ($U_E, T_E$) to enable verification of satisfactory client and server performance under the contract. Verification of satisfactory performance is performed by determining whether the client's behavior satisfies the server expected utility threshold and whether the QoS provided by the server satisfies the global client expected utility threshold.

In an alternative embodiment, a client formulates an offer for a QoS agreement in the absence of obtaining any server operating modes from the server agent. The client offer includes a server operating mode 15 and a client behavior mode 25 in the client-generated offer. The offer is included in a first call from the client under the proposed QoS agreement. The first call indicates that acceptance of the QoS offer can be provided by the server processing the first call according to the terms of the proposed QoS agreement. In this manner, the negotiation can be streamlined to maximize efficiency.

In a preferred mode, the calculation of expected utility by the server agent includes utilizing an expected default interaction function. This function is utilized by the server agent when the client guarantee 23 is silent regarding a particular client behavior parameter which is of interest to the server agent. The expected default interaction function enables an expected utility calculation for the particular client behavior parameter given the operating mode which the server agent is proposing. The expected default interaction function can reflect the server agent's past interactions with the client agent, or it might reflect past client behavior data which the server agent received from a reputation broker, not shown. The expected default interaction function can also be parameterized on the client's identity and the client's guarantee.

A related function employed by the server agent in the expected utility calculation process is a trust function. The client agent is capable of intentionally misrepresenting what the client's behavior will be under a proposed QoS agreement. The trust function is representative of a level of trust which the server agent possesses with regard to the client agent and it is used to modify values in the client guarantee which results in a modification of the calculated expected utility. For instance, the client agent might represent that the client will make no more than ten calls in any 24-hour period under the proposed agreement. However, the server agent might have information which indicates that the client has broken that same promise in the past 90% of the time. Consequently, even if the server agent would have accepted the client agent's offer if the promise were taken at face value, upon filtering the offer with the trust function, the server agent might reject the offer. Client agent trustworthiness data which the trust function utilizes can be based on past interactions the server agent has had with the client agent, or the data can be obtained from a reputation broker, not shown. The reputation broker has either polled the trustworthiness data from other servers or has entered into QoS agreements itself with the client agent to determine the client agents trustworthiness. A trust function can also be utilized to filter information provided by the reputation broker based on the trustworthiness of the broker.

In a preferred embodiment, the calculation of expected utility by the client agent includes utilizing an expected default provision function if the server guarantee does not include a reference to a dimension of interest to the client. The expected default provision function provides expected server QoS behavior with regard to the dimension of interest in the same form as would be included in a server guarantee 11. The client agent uses this expected QoS behavior information in the expected utility calculation. The expected server QoS behavior can be based on the server's past identity, the server's behavior and the server guaranteed 11.

The client agent also preferably utilizes a trust function in the calculation of expected utility of server operating modes. The client agent's use of the trust function is analogous to that of the server agent. The server agent is also capable of intentionally misrepresenting what the server's QoS behavior will be under a proposed QoS agreement. The trust function is utilized to modify a declared server guarantee to reflect the believed server guarantee. For example, if the mean availability specified in a server guarantee is X, the trust function might reduce the value to a believed value of 0.8X. The trust function can be based upon past interactions with the server agent, the server's identity, and the server's guarantees. Alternatively, the server agent trustworthiness data is assembled by a reputation broker which has either polled the trustworthiness data from other servers or has negotiated QoS agreements with the server agent to determine the server's trustworthiness directly. The broker then transmits the trustworthiness data to the client agent upon request.

Another embodiment of the trust function can include a certification process whereby a third party certifies a level of trustworthiness of agents. Upon initiating a negotiation, the server agent and the client agent produce their respective trustworthiness certifications. The server agent might calibrate its trust function according to the client agent's certification and the client agent might calibrate its trust function according to the server agent's certification.

Figure 4:
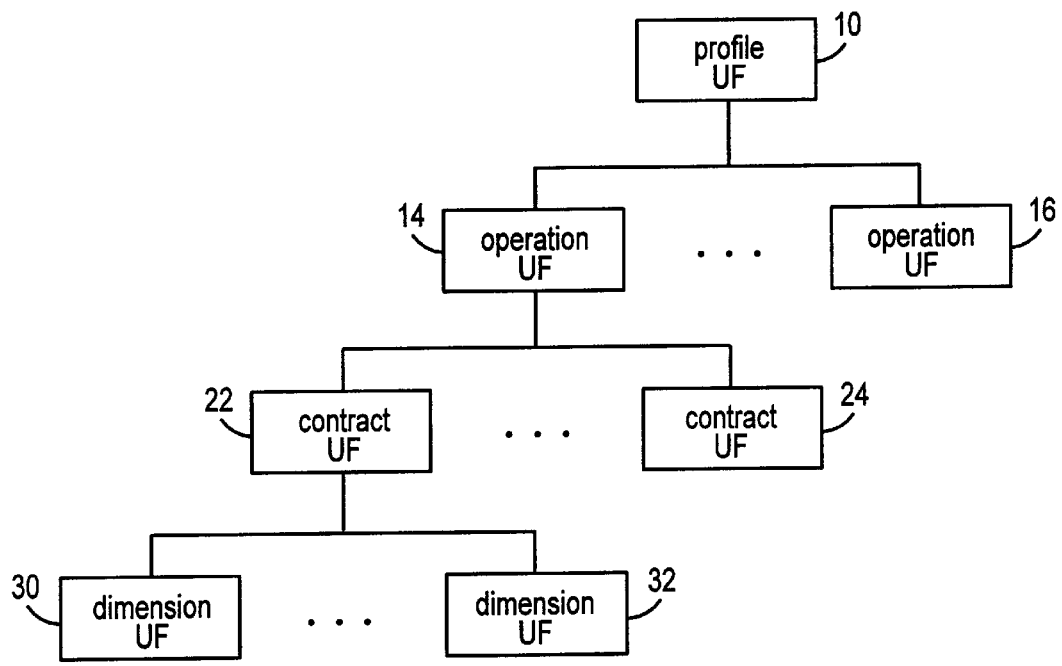
FIG. 4 is a schematic representation of a utility function profile for calculating an expected utility of a QoS specification in a utility-based embodiment of the QoS negotiation.
Figure 5:
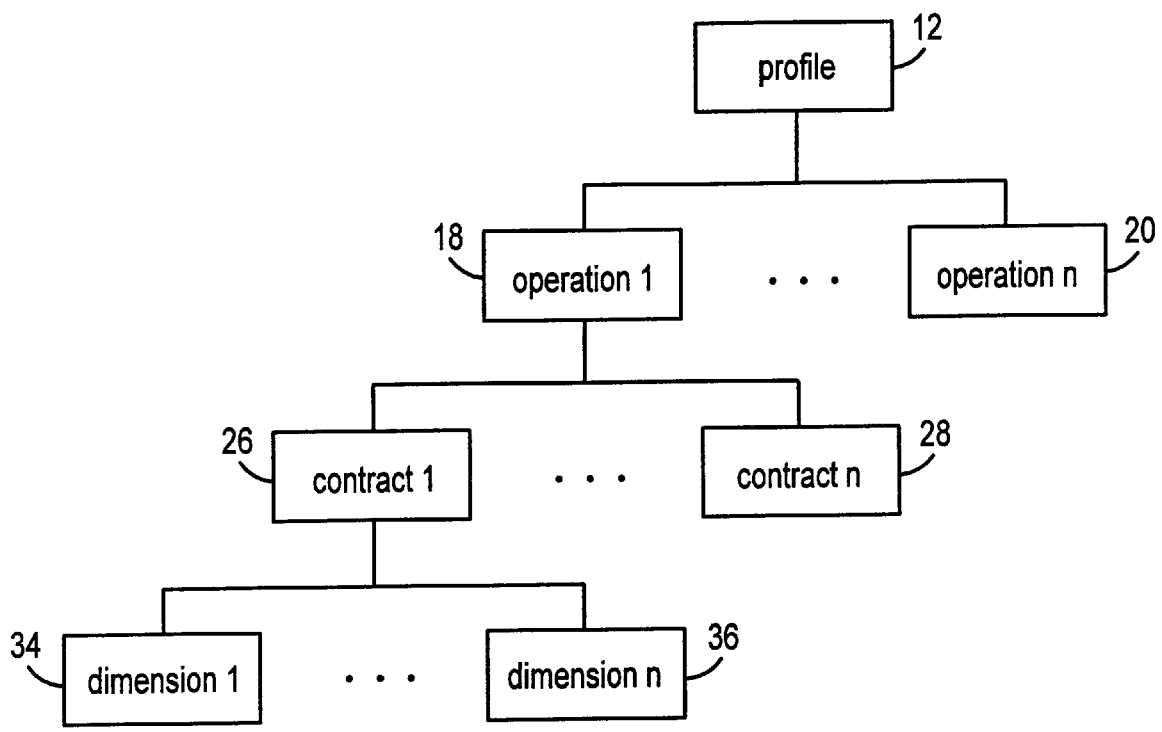
FIG. 5 is a schematic representation of a QoS specification in a utility-based embodiment for a QoS negotiation.

Referring to FIGS. 4 and 5, schematic representation of a utility-based embodiment of a multi-category QoS negotiation includes a profile utility function 10 associated with a profile of a multi-category QoS specification 12. The multi-category QoS specification is generated by a server (not shown) to represent to a client (not shown) the QoS levels at which the server is able to provide services. As will be described in greater detail below, the client utilizes the profile utility function 10 to calculate the expected utility to the client of the QoS specification. The QoS specification is arranged in a hierarchical manner, and consequently, a utility profile which defines all of the utility functions utilized to calculate the expected utility also has a hierarchical organization.

The profile utility function 10 calculates the expected utility of the QoS specification by applying weights to the expected utility values of n operations. The operations include a first operation 18 through $n^{th}$ operation 20, with n representing any positive integer. The expected utilities of the operations are calculated by first and second operation utility functions 14 and 16. The first operation 18 might be a buy operation and the $n^{th}$ operation a sell operation of an on-line foreign exchange trading service. If the buy operation is more important to the client than the sell operation, the client profile utility function 10 assigns a higher weight to the buy operation than it assigns to the sell operation.

Each operation includes at least one contract, with each contract representing a category of the QoS specification such as reliability, performance, or security. The buy operation 18 includes a first contract 22 through an $n^{th}$ contract 24, with n representing any positive integer. The buy operation utility function 14 calculates an expected utility for the buy operation by assigning weights to the various contracts 26 and 28 included in the buy operation. In FIG. 1 the first contract represents the QoS category of reliability and the $n^{th}$ contract 28 represents the QoS category of performance. If the client desires performance over reliability, the operation utility function 14 weights the performance contact expected utility more heavily than the reliability contract expected utility.

Although both the profile utility functions and the operation utility functions have been described as calculating expected utility by applying weights to operations and contracts respectively, this is not critical to the invention. The profile and operation utility functions can utilize other more sophisticated methods for calculating expected utility.

The reliability contract 26 includes dimension 1 through dimension n, 34 and 36, with n representing any positive integer. The expected utilities of dimension 1 and dimension n are calculated utilizing a dimension 1 utility function 30 and a dimension n utility function 32. The first dimension 34 may represent a dimension called availability, which is part of the reliability contract 26. Referring briefly to FIG. 2, a graph representative of an embodiment of the availability utility function is shown. Assuming that the QoS specification guarantees the availability will be between a and b with a generally uniform distribution, the expected utility may be the mean of the integral for the interval between a and b.

Figure 7:
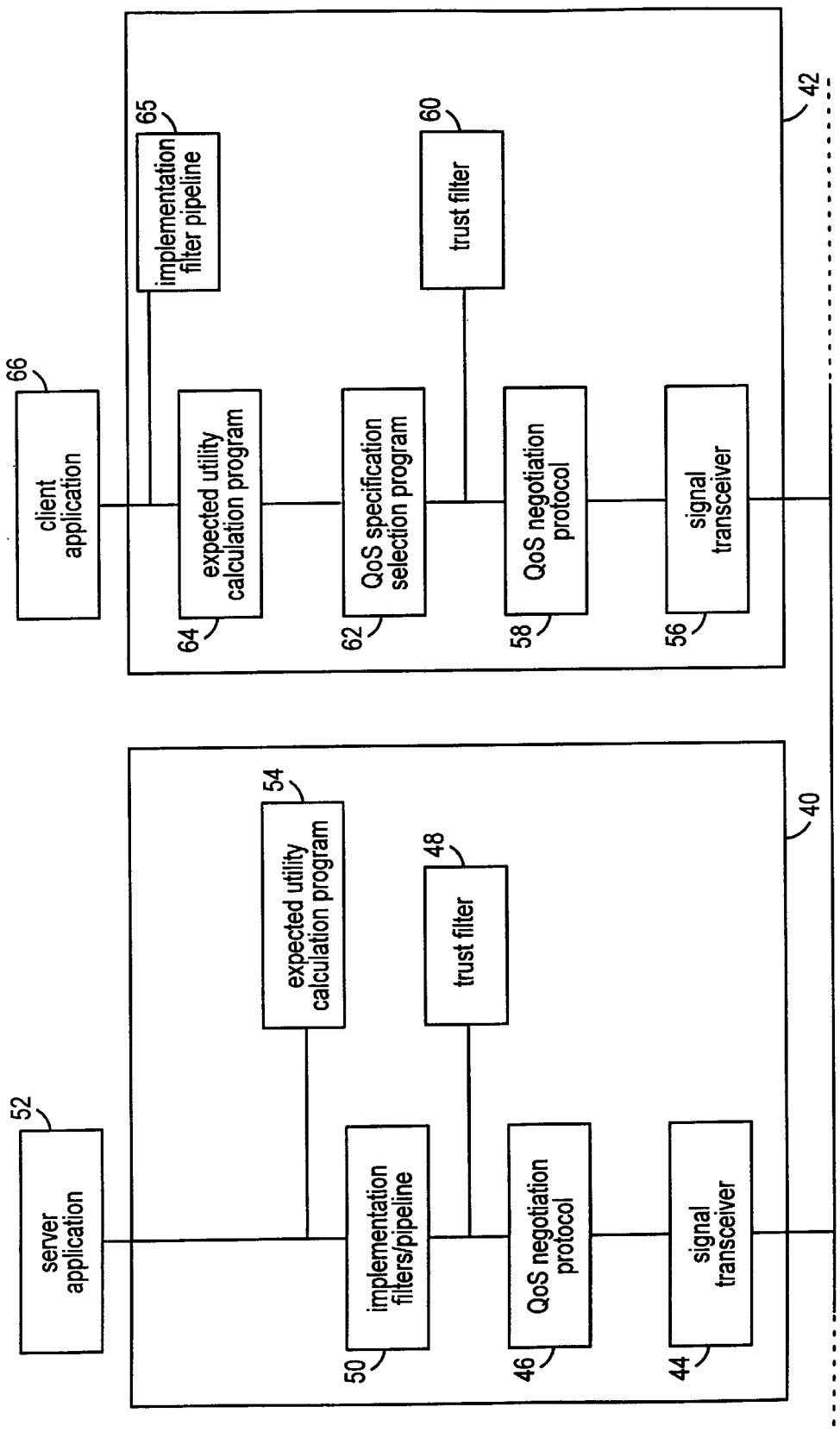
FIG. 7 is a block diagram of a server agent and a client agent according to the present invention.

Referring to FIG. 7, a server agent 40 and a client agent 42 provide QoS negotiation functionality on behalf of a server and a client, respectively. It should be understood that both the server agent 40 and the client agent 42 are not necessarily contained in stand-alone devices separate from the server and the client. It is possible that the functional components of both agents are integrated into software and distributed throughout the network on which they reside. The server and client agents 40 and 42 might alternatively be incorporated into the server and client, respectively.

The server agent 40 is associated with a server application 52. The QoS negotiation centers around the QoS levels at which the server can provide a service for the client and the client behavior modes on which the QoS levels will be conditioned. The server application 52 is configured to generate preliminary QoS specifications for services supported by the server. The preliminary QoS levels represented in the preliminary QoS specifications might not reflect the environment in which the server application 52 operates. That is, the server application 52 might not be configured to factor in the resources of the distributed system when formulating these preliminary QoS specifications. Requiring the application 52 to determine the QoS that its environment can support places a burden on the application and it requires the application to be aware of low-level system details. Consequently, if the server application 52 does not take system resources into account, the preliminary QoS specifications need to be modified to more accurately reflect the QoS levels which the system resources are capable of supporting.

Figure 8:
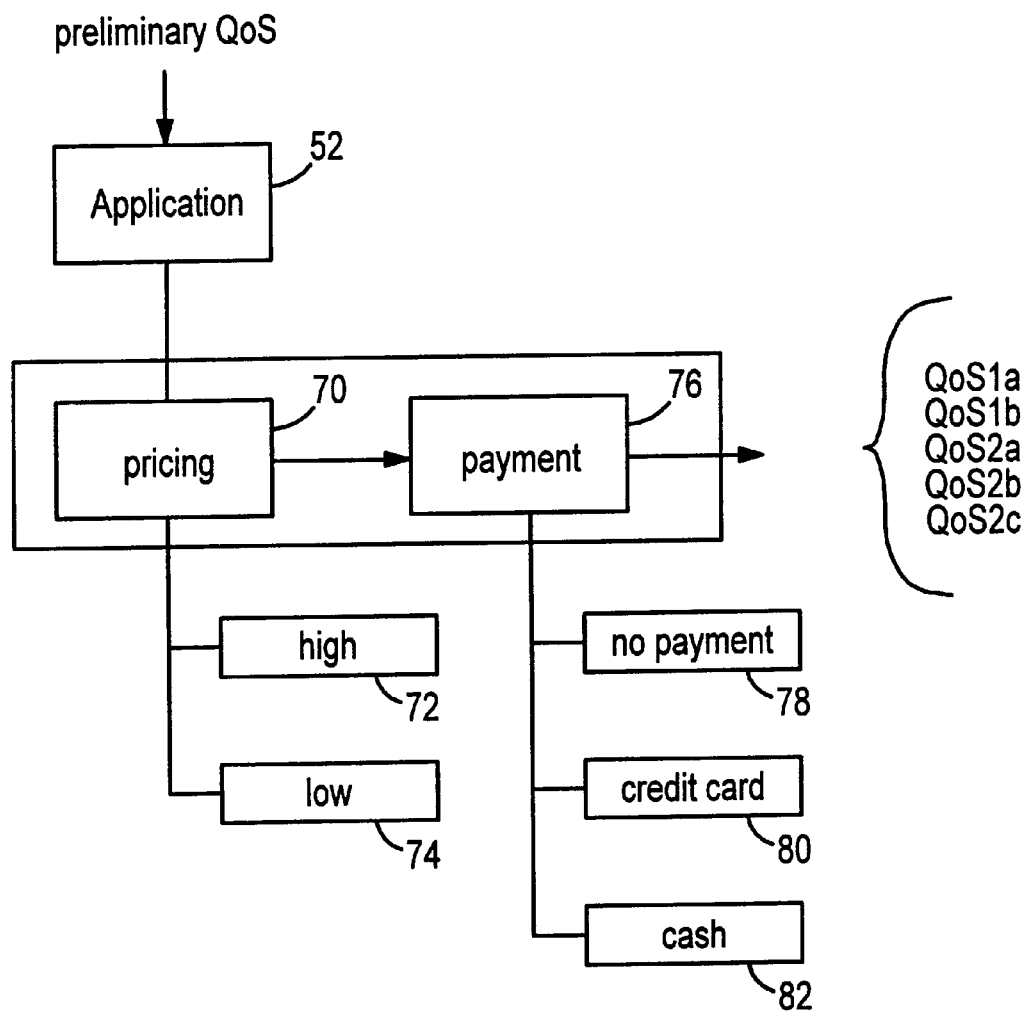
FIG. 8 is a block diagram of an embodiment of a filter pipeline illustrating the cooperation of filters in processing a preliminary QoS specification.

A server implementation filter pipeline 50 enables network components to modify the preliminary QoS specification to accurately reflect the capabilities and requirements of those components. Referring now to FIG. 8, an example of an implementation filter pipeline is shown wherein the application 52 is connected to a series of two filter types, or meta-filters, which include a pricing meta-filter 70 and payment meta-filter 76. Each meta-filter is associated with a distributed system component which supports some aspect of a QoS specification. A particular system component might be associated with multiple filters. For instance, a payment system component (not shown) determines a client payment method for payment of services rendered by the server under the QoS agreement. Associated with the payment meta-filter 76 might be three payment filters; a no payment filter 78, a credit card filter 80, and a cash payment filter 82. A pricing meta-filter includes a high price filter 72 and a low price filter 74.

A preliminary multi-category QoS specification generated by the application 52 includes some price for a service. The pricing meta-filter 70 transmits the preliminary QoS specification to both the high price filter 72 and the low price filter 74 for processing. The preliminary QoS specification is modified to produce filtered specifications QoS1 and QoS2. The filtered specifications QoS1 and QoS2 are then collected by the pricing meta-filter 70 to be transmitted to the payment meta-filter 76. Assume that specifications filtered by the high price filter 72 require either credit card 80 or cash 82 as payment and that a specification filtered by the low price filter can be processed by any of the three payment filters. QoS1 is filtered to produce QoS1$a$ and QoS1$b$, while QoS2 is processed to produce QoS2$a$, QoS2$b$, and QoS2$c$. From a single preliminary QoS specification, five filtered multi-category QoS specifications emerge after filtering. It is evident from the example above that when one filter modifies a specification, the filter can modify the specification in such a manner that it may impose restrictions on the downstream filters such that some offers may be pruned out. Thus, interdependencies between the filters can be naturally captured through the pipeline design.

Filtering of a single preliminary QoS specification can generate multiple filtered QoS specifications. The potentially large quantity of filtered QoS specifications, hereinafter simply called QoS specifications or multi-category QoS specifications, poses a problem for data storage and transport if the QoS specifications are represented as individually distinct offers. In order to more efficiently store and transport the QoS specifications, a disjunctive representation can be used to represent the QoS specifications. Continuing with the example in FIG. 8, assume that QoS1$a$ has had dimensions X and Y modified to Xa and Ya and that QoS1$b$ has had dimensions X and Y modified to Xb and Yb. Assume further that both QoS1$a$ and QoS1$b$ have ten remaining dimensions in common. Instead of storing these identical ten dimensions twice for QoS1$a$ and QoS1$b$, a single representation of these ten dimensions can be stored in one copy. Data can be stored in association with the single copy of the ten common dimensions and the X and Y dimensions which indicate the filtering steps performed on dimension X and Y to produce Xa and Ya and Xb and Yb. In this manner disjunctive representation of the QoS specifications enables efficient storage and transport.

Figure 9:
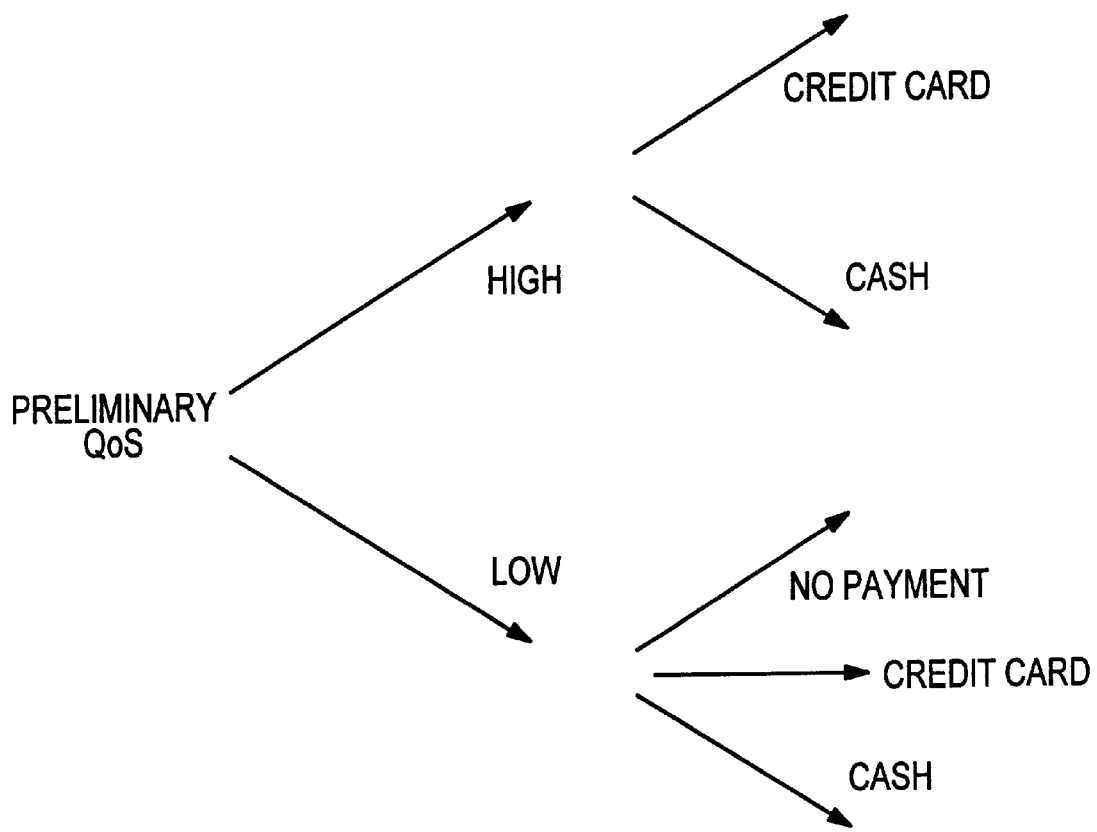
FIG. 9 is a schematic representation of a disjunctive representation of a filtered QoS specification.

Referring to FIG. 9, a schematic diagram of a disjunctive representation shows that the preliminary QoS specification is stored as a single copy. The filtered QoS specifications are represented by the modification steps which the filters in the filter pipeline execute. Continuing with the example presented in FIG. 8, the high price filter modification step is represented by the arrow labeled high. The credit card filter 80 and the cash filter 82 execute modification steps which are represented by the credit card arrow and the cash arrow. The low price filter modification step is represented by the low arrow which precedes the modification steps executed by the no payment filter 78, the credit card filter 80 and the cash filter 82 represented respectively by the no payment arrow, the credit card arrow, and the cash arrow. In this manner a single copy of the preliminary QoS specification can be stored together with data representing the filtering steps performed on the preliminary QoS specification to produce the filtered QoS specifications.

The filters can also be configured to modify the preliminary QoS specifications to include out-of-band information such as implementation specific information, signal required capabilities, and parameterization. For instance, a filter might attach data which serves as a reminder to a particular implementation that certain resources must be available to execute a particular QoS agreement incorporating the terms of a particular QoS specification. A transaction identifier is also added to the preliminary specifications which becomes a deal identifier if the specification is incorporated into an agreement.

Returning to FIG. 7, in a preferred embodiment the server agent 40 includes an expected utility calculation program 54 which can be utilized to calculate the expected utility of offers received from the client agent 42. A trust filter 48 enables the server agent to utilize trustworthiness data regarding the client to modify the expected utility of offers from the client agent by modifying the expected behavior data provided by a client agent according to the trustworthiness of the client agent. A QoS negotiation protocol 46 establishes a set of rules for transmission and receipt of messages via the signal transceiver 44 during the negotiation process with the client agent 42.

The client agent 42 is associated with a client application 66 which can be utilized to create preliminary QoS specifications to be included in an offer for a QoS agreement. A client implementation filter pipeline 65 modifies the preliminary QoS specifications according to general resource capabilities of the system. The client agent 42 further includes an expected utility calculation program 64 and a QoS specification selection program 62 for selection of QoS specifications to be included into offers to the server agent 40. A client trust filter 60 modifies QoS specifications received from the server agent 40 according to trustworthiness data for the server agent 40. The client agent further includes a QoS negotiation protocol 58 and a signal transceiver 56 for communication with the server agent 40 during negotiation of a QoS agreement.

Figure 10:
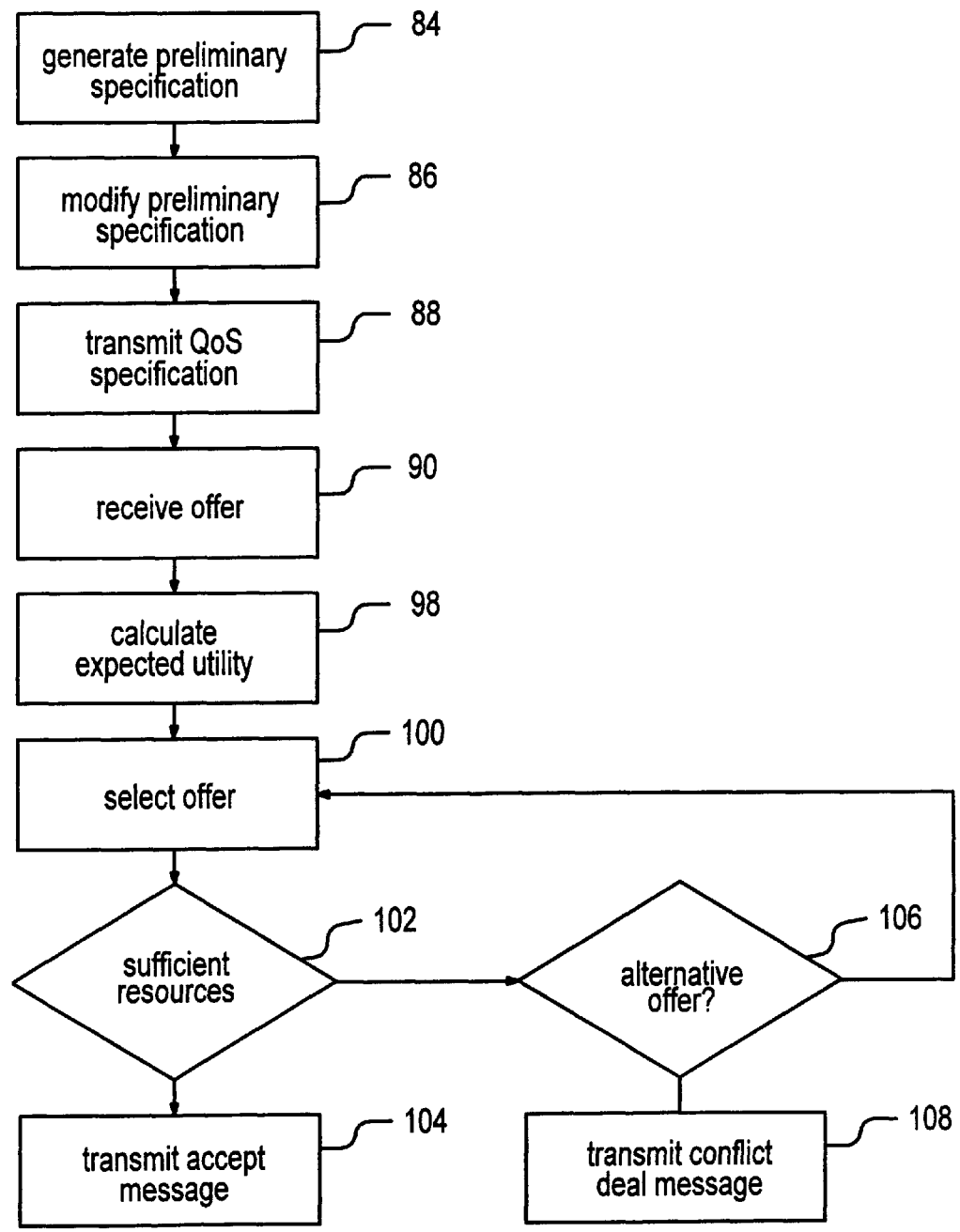
FIG. 10 is a process flow for an operation of the server agent in FIG. 7.

Referring to FIGS. 7 and 10, a method for the operation of a server agent 40 during a QoS negotiation includes the step 84 of a server-associated application 52 generating a preliminary QoS specification. As previously discussed, the server application 52 does not take into account the limitations of its environment when generating the preliminary specification. In step 86 the preliminary QoS specification is modified by the implementation filters 50 to produce QoS specifications which reflect resource limitations of the distributed system. The client agent 42 requests a set of offers which include QoS specifications from the server agent 40, and in step 88 the server agent transmits a set of QoS specifications to the client agent 42. The offer transmitted by the server agent 40 includes a QoS specification and an associated client behavior profile which the server agent 40 requires from the client in order to provide the QoS indicated in the QoS offer.

As will be discussed in greater detail below, the client agent 42 performs conformance checking and expected utility calculations on the QoS specifications transmitted by the server agent 40. In step 90, the server agent 40 receives an offer which might contain a QoS specification and an associated client behavior profile, which the client agent 42 proposes as a basis for a QoS agreement. Alternatively, if none of the QoS specifications which the server agent 40 transmitted were deemed to be satisfactory, the client agent 42 might transmit a conflict deal message indicating it has no desire to negotiate any further.

If the offer received in step 90 proposes a QoS agreement, the server agent 40 calculates an expected utility for the offer in step 98. The utility calculation might be based on a server operating mode preference function and/or a client behavior profile utility function. The server operating mode preference function correlates particular QoS specifications to utility values to the server and the client behavior mode preference function correlates the client behavior profiles to expected utilities to the server. Based on the utility calculation, in step 100 the server agent selects an offer to be considered for acceptance.

In a preferred mode, the server agent 40 employs a trust function in the utility calculation process. The trust function is representative of a level of trust which the server agent 40 possesses with regard to the client agent and it is used to modify values in the client's offer resulting in a modification of the calculated expected utility. For instance, the client agent 42 might represent that the client will make no more than ten calls in any 24-hour period under the proposed agreement. However, the server agent 40 might have information which indicates that the client has broken that same promise in the past 90% of the time. Consequently, even if the server agent would have accepted the client agent's offer if the promise were taken at face value, upon filtering the offer using the utility function, the server agent 40 might reject the offer. The client agent trustworthiness data which the trust function utilizes can be based on past interactions the server agent 40 has had with the client agent 42, or the data can be obtained from a reputation broker, not shown. The reputation broker has either polled the trustworthiness data from other servers or has entered into QoS agreements itself with the client agent to determine the client agent's trustworthiness. A trust function can also be utilized to filter information provided by the reputation broker based on the trustworthiness of the broker.

In step 102 the server agent determines if sufficient resources are available to the server to support the requirements of the selected offer. Unlike the filtering of the application-generated preliminary QoS specification, the determination of resource availability in step 102 involves specifically determining if previous commitments assigned to the resources necessary to support the proposed QoS levels prevent the server from being able to fulfill the terms of the proposed agreement. If it is determined that sufficient resources are available, the agent accepts the offer in step 104. If sufficient resources are not available, in step 106 it is determined whether any alternative offers are available for consideration. If no alternative offers are available, the server agent transmits a conflict deal message in step 108. Alternatively, the server agent might transmit a counteroffer in step 108.

Figure 11:
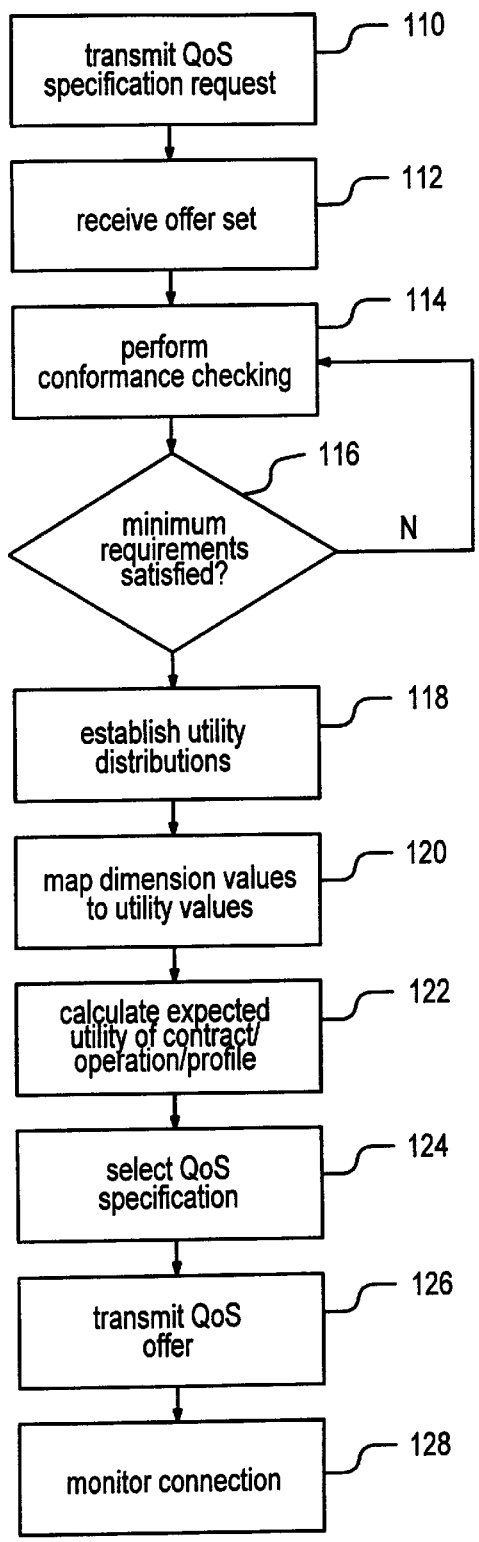
FIG. 11 is a process flow for an operation of the client agent in FIG. 7.

With reference to FIGS. 7 and 11, a method for utilizing a client agent 42 in a QoS negotiation includes the step of transmitting a request for an offer sent to a server agent 40 in step 110. In step 112 an offer set is received from the server agent 40 which includes multiple QoS specifications. A possibility exists that some of the QoS specifications included in the offer set do not satisfy minimum requirements as expressed by a constraint profile. Because calculation of expected utility is a resource intensive operation, it is not desirable to perform a full expected utility calculation on a particular QoS specification if that QoS specification does not satisfy the minimum requirements. The client agent 42 performs a conformance checking operation in step 114, wherein the client constraint profile is referenced to determine in step 116 if the QoS specification satisfies the minimum requirements of the client. If the particular QoS specification is determined not to satisfy the minimum requirements, a determination is made whether any other offers are to be considered by the client agent 42. If additional offers are available, then the client agent returns to step 114 to perform conformance checking on the remaining offers.

Prior to commencing the utility computation process for any offers which satisfy the minimum requirements, the contracts for each operation in the QoS specification are identified. Those contracts which do not have a corresponding contract in the constraint profile are omitted from the calculation process. Any contracts in the QoS specification which are not found in the client's constraint profile involve QoS guarantees which the client does not require.

Figure 6:
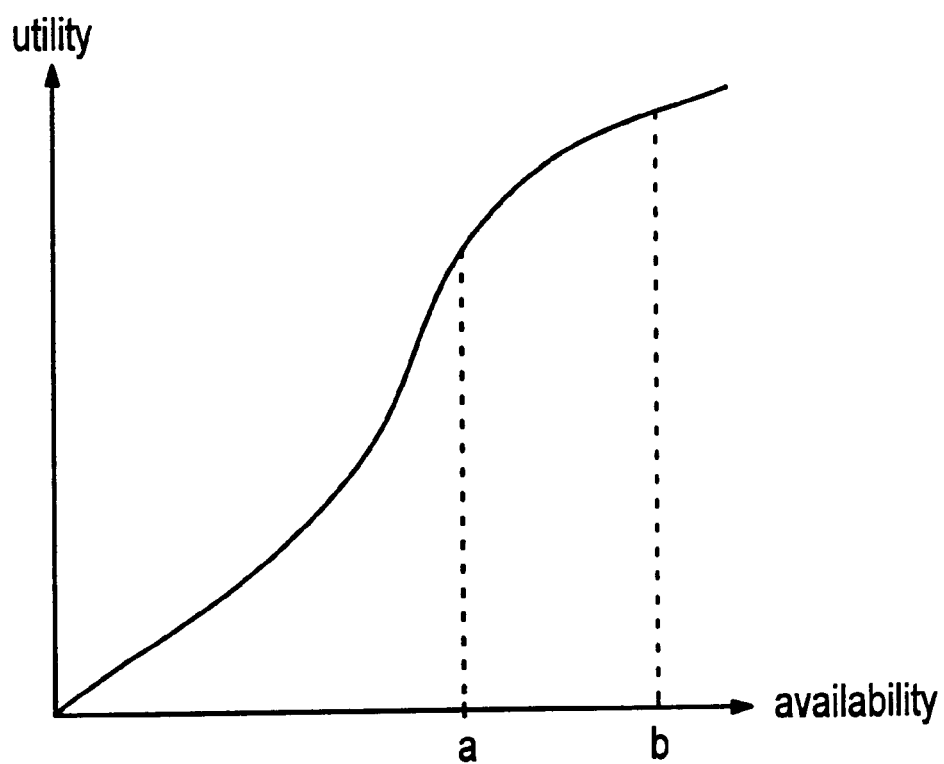
FIG. 6 is a graph of a utility distribution for an availability dimension of the QoS specification shown in FIG. 5.

If an offer is determined to satisfy the minimum requirements in step 116, a utility profile is utilized to establish which utility functions are to be utilized in calculating the expected utility of dimensions. Referring back to the example in FIG. 6, the utility function for availability establishes a utility distribution in step 118 which correlates the values for availability to utility values to the client. In step 120 the dimension values specified in the QoS specification (a, b) are mapped to utility values and the expected utility value can be calculated by, for example, calculating the mean utility in the interval between the availability values a and b.

In step 122 the expected utilities of the contracts and operations are calculated to arrive at an expected utility of the profile, that is the QoS specification. The corresponding contract utility function is applied to each of the contracts to obtain the utility of each contract. In a preferred mode, the utility of each contract is normalized by dividing the utility by the sum of the utilities of each dimension defined in the contract to obtain the expected utility of each contract. The aggregated utility of an operation is calculated by multiplying the weights of each contract, as specified by the operation utility function, with the calculated expected utility of each contract and summing the results. The expected utility of an operation is then calculated by dividing its utility by the sum of the weights of all the contracts defined for the operation. The expected utility of each operation is multiplied by the weight associated with the operation. The aggregated utility of a QoS specification is the sum of all the weighted utilities of the operations. The expected utility of a specification is obtained by dividing its utility by the sum of the weights of all the operations defined for the specification.

A more formal description of the algorithm for calculating the expected utility is given in the code below. SP stands for server profile, CP for constraint profile, EW stands for expected utility of a server profile, $wf_c$ stands for the utility function that calculates the utility of a contract in an operation, $wf_p$ stands for the utility function that returns the weight of an operation. The function Sums (X) returns the sum of the weights and values of all Xs. That is, if X=C, then Sums (X) returns the sum of the values of every dimension in every contract. If X=O, then the function returns the sum of the weights for all of the contracts. If X=P, then Sums (P) returns the sum of the weights of all the operations.

```
Begin
  EW = 0; Utility_p = 0;
  For all operations O in SP
  {
    Expect_o = 0; Utility_o = 0;
    For all contracts C for O in SP and CP
    {
      Expect_c = wf_c(C) / Sums(C);
      Utility_o += wf_c(C) * Expect_c;
    }
    Expect_o = Utility_o / Sums(O);
    Utility_p += wf_p(O) * Expect_o;
  }
  EW = Utility_p / Sums(P);
End;
```

The client agent 42 also preferably utilizes a trust function in the calculation of expected utility of QoS specifications. The client agent's use of the trust function is analogous to that of the server agent 40. The trust function is utilized to modify declared values of dimension to reflect the believed value to the client agent. For example, if the value for availability specified in a QoS specification as having a 90% probability of providing 98% availability, the trust function might reduce the stated probability to a believed probability of 70%. Again, the trust function can be based upon trustworthiness data for the server agent 40 based on past interactions with the server agent. Alternatively, the server agent trustworthiness data is assembled by a reputation broker and transmitted to the client agent upon a request for the trustworthiness data.

In step 124, the client agent 42 selects at least one QoS specification to be included into an offer for a QoS agreement. In step 126 the client agent 42 transmits the offer to the server agent 40 and in step 128, the client agent monitors the connection to the server agent for either an acceptance, a rejection, or a counteroffer.

A negotiation protocol establishes the rules for transmission of messages which comprise the communication between the server agent 40 and the client agent 42 during the negotiation process. The messages that can be exchanged between two negotiating agents can be informally described as follows:

request offer set: Sent by client to request all the offers that the server is willing to accept in a deal. The message conveys a client profile.

send offer set: Sent by the server in response to a request offer set message. The message body contains all the offers that the server supports. The client may select one of these and propose it as a deal to the server.

send offer: Sent by either agent to make an offer (or counteroffer) to the other. It can be sent as a response to a send offer.

deal: Sent by an agent that received an acceptable offer from the other agent. The message indicates that the agent that received the most recent offer is willing to accept it as a deal.

acknowledge deal: Sent by either agent as a response to the deal message.

conflict deal: Sent by either agent as a response to a send offer message. The message indicates that the received offer was not acceptable and that the agent does not intend to make a counteroffer.

acknowledge conflict deal: Sent by either agent as a response to a conflict deal.

stop: This message can be sent by either agent to stop negotiating immediately. It can be due to a failure, application shutdown, change of priorities or any other reason.

The message send offer conveys an offer consisting of a server profile and a client profile. The message send offer set carries a set of offers provided by the server. All of the messages convey a transaction identifier, that becomes the deal identifier if a deal is reached. The deal identifier is used to associate individual operation invocations with deals.

The set of messages sent from the application to the negotiation mechanism can be summarized as follows:

abort: Sent by the application to its negotiation mechanism to indicate the termination of all ongoing negotiations for that application.

neg: Sent by the application to initiation negotiation.

regOffers: Sent by server application to register new any offers that provides.

Figure 12:
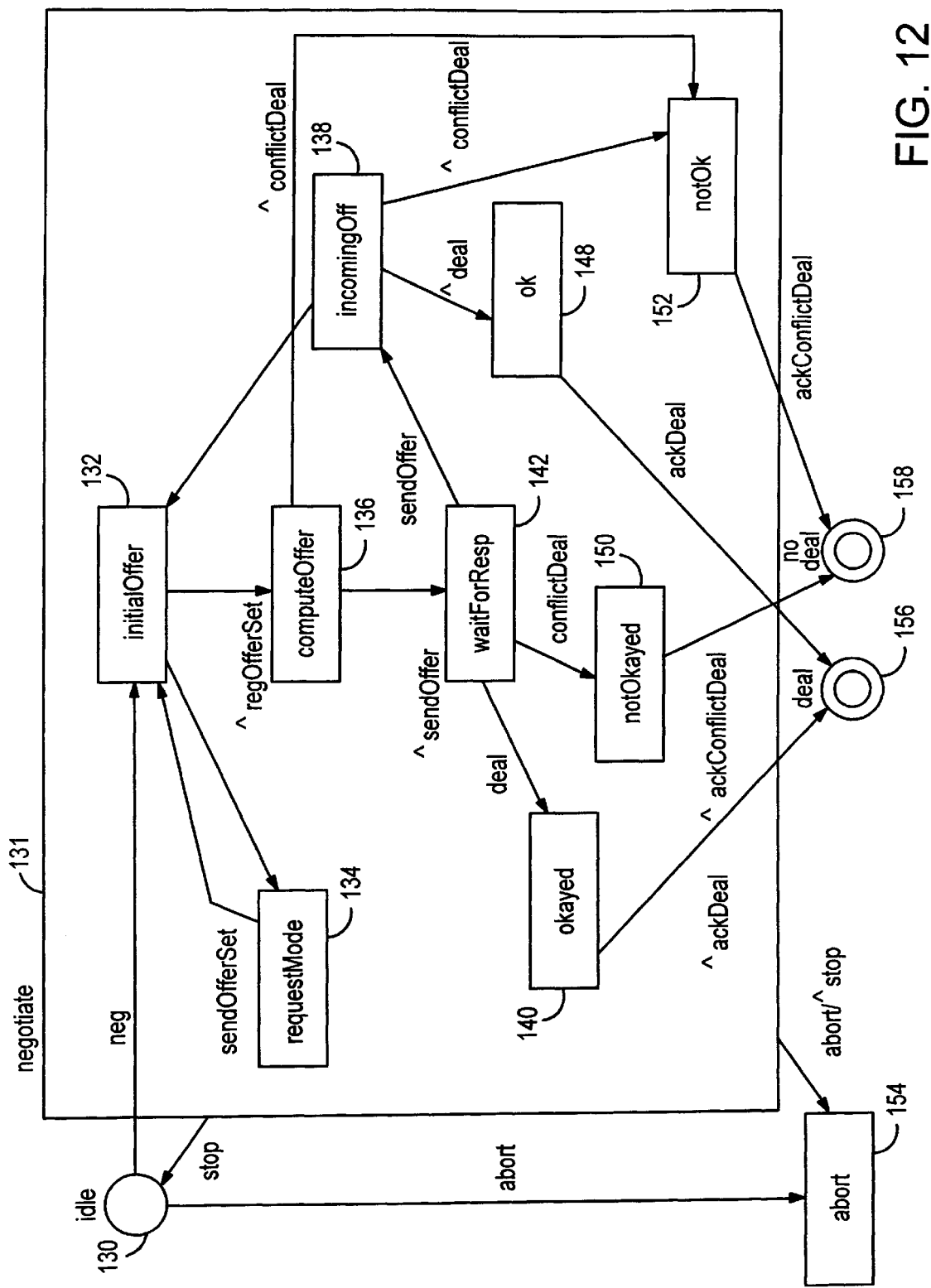
FIG. 12 is a state diagram illustrating the various operational states of the client agent during a negotiation.
Figure 13:
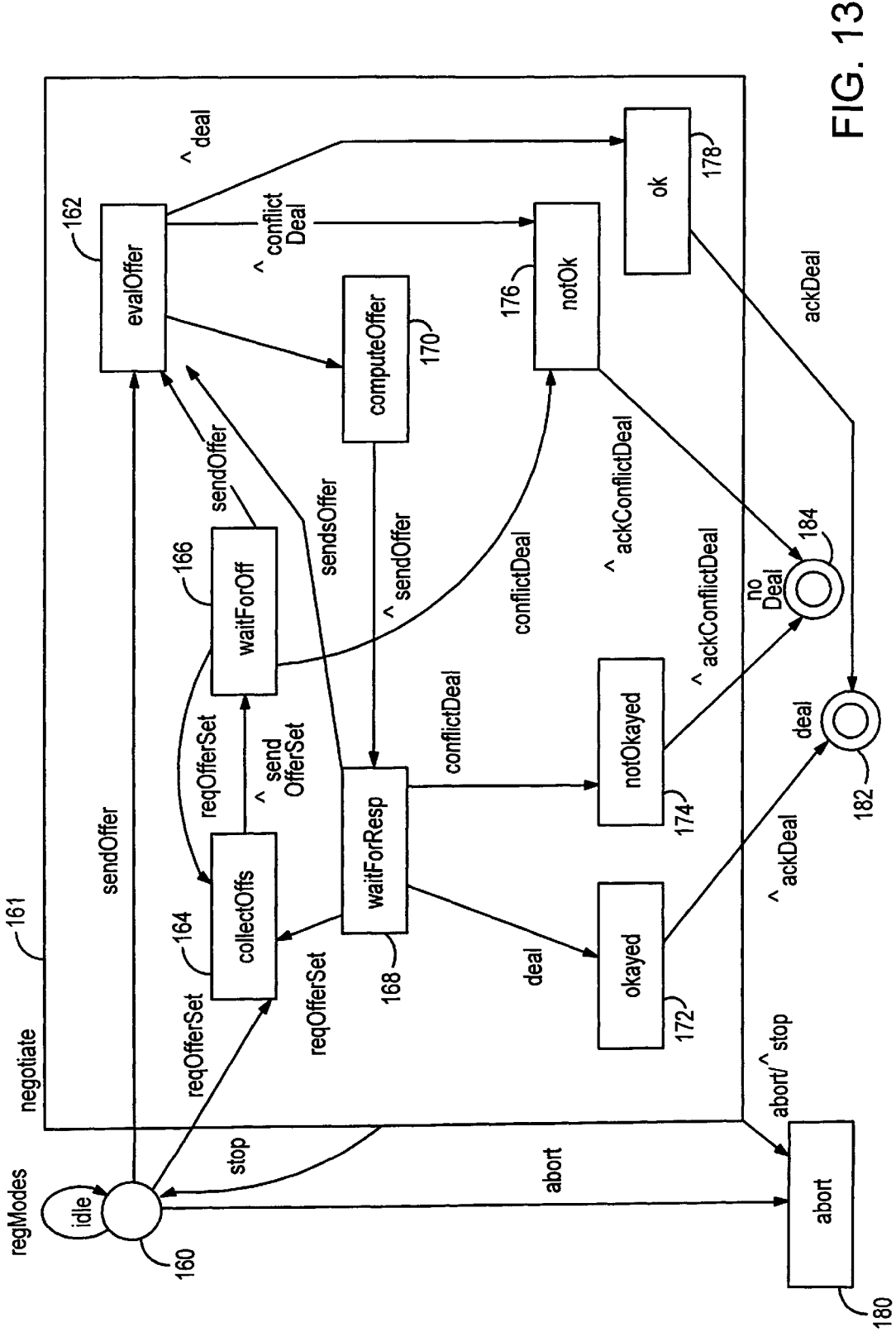
FIG. 13 is a state diagram illustrating the various operational states of the server agent during a negotiation.

FIGS. 12 and 13 illustrate the client-side and server-side negotiation state machines respectively. The procedures for the client and server negotiation mechanism are illustrated as state-charts. A box represents a state and an arrow a state transition. Transitions are represented by labels with zero or one incoming or outgoing events and zero or more actions. Incoming events, outgoing events, and actions are represented as follows: Event/^out event/action. States can be nested and a transition from an outer state indicates a transition that applies to all inner states. A circle represents a start state, and two nested circles represent a valid end state.

Referring to FIG. 12, a client negotiation mechanism is normally in an idle state 130. When it receives a negotiation request from the client, the client mechanism leaves the idle state 130 and enters into a negotiate state 131. The client negotiation mechanism also transitions to an initialOffer state 132 in response to the negotiation request. In initialOffer 132, the mechanism determines if its server offers are valid or if it requires an updated set of server offers. If an updated set of offers is required, the client mechanism transitions to the requestMode 134, wherein the client mechanism transmits a request offer set message to the server agent 40. If the client mechanism already has a valid set of server offers, it transitions to the computeOffer state 136, wherein the client mechanism computes an offer to transmit to the server agent 40. If the offer is for a conflict deal, the mechanism transitions to a notOk state 152. If the client mechanism receives an ackConflictDeal message in the notOK state 152, the client mechanism transitions to a noDeal end state 158.

If the client mechanism transmits an offer for a QoS agreement at state 136, it transitions to the waitForResp state 142. The client mechanism can receive three different messages in the waitForResp state 142, a deal message, a conflictDeal message, and a sendOffer message. The deal message indicates acceptance from the server negotiation message. In response, the client mechanism transitions to the okayed state 140, wherein it transmits an acknowledge deal message. The client mechanism then transitions to deal end state 156. If the client mechanism receives a conflict deal message while in the waitForResp state 142, the mechanism transitions to notOkayed 150. If the client mechanism receives an acknowledge conflict deal in the notOkayed state 150, it transitions to noDeal 158. If the mechanism receives a sendOffer message in the waitForResp state 142, the client mechanism transitions to an incomingOff state 138. If while in the incomingOff state 138 the client mechanism receives a conflict deal message, it transitions to the notOk state 152. If the client mechanism transmits a deal message while in the incomingOff state 138, it transitions to the ok state 148, wherein it receives an acknowledge deal message to transition to the deal end state 156. The negotiation will always be interrupted if the client mechanism receives the stop message. If the client negotiation mechanism transmits a stop message, it transitions to the abort state 154 and the negotiation is interrupted.

Referring to FIG. 13, the server-side negotiation mechanism transitions from an idle state 160 to a negotiate state 161 upon receiving either an offer or an offer request. If the server negotiation mechanism receives an offer, it transitions to an evalOffer state 162. In the evalOffer state the server mechanism can either transmit a conflict deal message to arrive at the notOk state 176 or a deal message to arrive at the ok state 178. If the client mechanism transmits an acknowledge conflict deal while the server mechanism is in the notOk state 176, the server mechanism transitions to the noDeal end state 184. If the server mechanism receives an acknowledge deal while in the ok state, it transitions to the deal end state 182. If the server mechanism desires to transmit a counteroffer while in the evalOffer state 162, it transitions to the computeOffer state 170. The server mechanism transmits the counteroffer in a send offer message and transitions to a waitForResp state 168.

While in the waitForResp state 168, the server negotiation mechanism can receive a deal message or a conflict deal message. Receiving the conflict deal message causes the server mechanism to transition to the notOkayed state 174 from which it transmits an acknowledge conflict deal message to arrive at the noDeal end state 184. Receiving the deal message while in the waitForResp state 168 causes the server mechanism to transition to the okayed state 172 from which the mechanism transmits an acknowledge deal message to arrive at the deal end state 182.

If the server mechanism receives a request offer set message while in the idle state 160, it transitions to a collectOffs state 164. The server mechanism transmits a send offer set message and transitions to waitForOff state 166 from in which the server mechanism will either receive a conflict deal message or a send offer message which includes an offer for a QoS agreement. If the server mechanism receives a conflict deal message while in the waitForOff state 166, it transitions to the notOk state 176 from which the server mechanism transmits an acknowledge conflict deal message to arrive at the noDeal state 184. If the server mechanism receives an offer for a QoS agreement while in the waitForOff state 166, the mechanism transitions to the evalOffer state 162.

If, while in the negotiate state 161, the server negotiation mechanism receives an abort message or transmits a stop message, the server mechanism transitions to an abort state 180 and the negotiation is interrupted. If the server negotiation message receives a stop message while in the negotiation state 161, it transitions to the idle state 160.

What is claimed is:

1. A method for negotiating a multi-category quality-of-service (QoS) agreement between a client and a server in a system comprising the steps of:

establishing a communications link having a client-side of said negotiating and server-side;

generating a plurality of multi-category QoS specifications, each said multi-category QoS specification being representative of a probabilistic estimate of QoS levels for a service available via said server, each category of said QoS specifications representing a different QoS-related parameter;

transmitting said plurality of multi-category QoS specifications over said communications link from said server-side to said client-side;

selecting at least one of said multi-category QoS specifications to be included in an offer for a QoS agreement;

identifying each said selected multi-category QoS specification as part of said offer, said offer requesting a service provided by said server at said probabilistic estimate of said QoS levels represented by said each selected multi-category QoS specification;

transmitting said offer over said communications link from said client-side to said server-side; and monitoring said communications link at said client-side for a response to said offer indicating one of an acceptance, a rejection, and a counteroffer to said offer.

2. The method of claim 1 further comprising the step of calculating an expected utility to said client for each said QoS specification, including calculating expected utilities of categories of said each multi-category QoS specification received via said communications link, said calculation of said expected utilities being performed at said client-side of said communications link and being based on said probabilistic estimate of said QoS levels available via said server, and further, wherein said step of selecting said at least one multi-category QoS specification includes basing said selection on said calculation of said expected utility.

3. The method of claim 2 wherein expected utility is specific to relative significance to said client and wherein said calculating step for each said multi-category QoS specification includes a hierarchical approach of:

establishing low level expected utilities for each of a plurality of dimensions associated with different categories of said multi-category QoS specifications, each dimension being representative of one of a qualitative and a quantitative QoS-related parameter of a category with which said each dimension is associated;

establishing an intermediate level expected utility for each said category based upon said low level expected utilities established for dimensions associated with said each category, said intermediate level expected utilities being said expected utilities of said categories; and establishing a high level expected utility for each said multi-category QoS specification based upon said intermediate level expected utilities established for said each multi-category QoS specification, said high level expected utility being said expected utility of said each multi-category QoS specification.

4. The method of claim 2 further comprising the step of:

determining whether said expected utility of each said multi-category QoS specification satisfies a preselected minimum expected utility threshold; and if an expected utility of a particular multi-category QoS specification does not satisfy said minimum expected utility threshold, disabling consideration of said particular multi-category QoS specification from inclusion into said offer.

5. The method of claim 2 further comprising the step of referencing a constraint profile which defines minimum requirements of said client to determine whether to perform said step of calculating said expected utility.

6. The method of claim 2 wherein said step of calculating said expected utility includes filtering said each multi-category QoS specification utilizing a trust function representative of a level of trust said client has with respect to said server, said trust level being indicative of a degree to which said server has satisfactorily performed under terms of past QoS agreements.

7. The method of claim 1 further comprising the steps of:

generating a preliminary multi-category QoS specification utilizing an application-associated with said server; and filtering said preliminary multi-category QoS specification to modify said preliminary multi-category QoS specification according to a capability of said system to support preliminary QoS levels represented by said preliminary multi-category QoS specification, said filtering of said preliminary multi-category QoS specification generating said at least one multi-category QoS specification.

8. The method of claim 1 further comprising the steps of:

receiving said offer that includes said at least one selected multi-category QoS specification;

determining whether said system is capable of supporting a QoS level associated with said selected multi-category QoS specification, said determination being based at least partially on previous commitments assigned to said system; and deciding whether to accept said offer on behalf of said server based at least partially on said determination of whether said system is capable of supporting said QoS level.

9. A system for enabling multi-category QoS negotiation toward a multi-category QoS agreement between a server and a client in a system comprising:

a server agent comprising:

a) means for establishing multi-category QoS specifications representative of probabilistic estimates of QoS levels associated with alternative services provided by said server;

b) first means for transmitting a plurality of said multi-category QoS specifications in response to receiving a multi-category QoS specification request for communication involving said client; and c) means for determining whether to enable said services based upon multi-category QoS offers received on behalf of said server; and a client agent comprising:

a) means, responsive to said first means to receive said plurality of multi-category QoS specifications, for selecting one of said multi-category QoS specifications for identification to said server agent on behalf of said client; and b) second means for identifying said selected multi-category QoS specification to said determining means of said server agent as at least a portion of a selected QoS offer.

10. The system of claim 9 wherein said client agent further includes means, connected to said first means and said selecting means, for calculating an expected utility to said client for each of said multi-category QoS specifications based on said probabilistic estimates of said QoS levels, and further, wherein said selecting means is responsive to said expected utility calculation by said calculating means.

11. The system of claim 9 wherein said probabilistic estimates of said QoS specifications are expressed for said categories of said multi-category QoS specifications in the absence of a linear combination of said probabilistic estimates.

12. The system of claim 10 wherein said calculating means of said client agent includes a client-agent trust filter configured to modify data within said multi-category QoS specification according to a first trust function, said first trust function being representative of a level of trust possessed by said client agent with respect to said server agent based on an extent to which QoS agreements negotiated by said server agent have been satisfactorily performed in the past, said determining means of said server agent including a server-agent trust filter configured to modify data within said selected multi-category QoS offer according to a second trust function, said second trust function being representative of a level of trust possessed by said server agent with respect to said client agent based on an extent to which QoS agreements negotiated by said client agent have been satisfactorily performed in the past.

13. The system of claim 10 wherein said calculating means of said client agent includes an expected default provision function enabled to calculate expected utilities for dimensions of said categories not included in said multi-category QoS specifications.

14. The system of claim 9 wherein said server agent further includes:

means, connected to said determining means of said server agent, for ascertaining whether sufficient resources are available to said server to support resource requirements of said selected multi-category QoS offer; and means, responsive to said determining means and said ascertaining means, for selecting a second multi-category QoS specification for inclusion into a counteroffer in response to a determination that said resource requirements are unavailable to said server.

15. The system of claim 9 wherein said establishing means of said server agent includes an application enabled to generate a preliminary multi-category QoS specification, said establishing means further including a plurality of filters associated with resources of said system supporting said service provided by said server, said filters being configured to modify said preliminary multi-category QoS specification to reflect capabilities of said resources to support said service, said modification of said preliminary multi-category QoS specification resulting in at least one of said multi-category QoS specifications.

16. The system of claim 9 wherein said first means for transmitting and said second means for identifying both include a negotiation protocol having rules for transmission of messages during said multi-category QoS negotiation.

17. A method for negotiation of a multi-category QoS deal between a server and a client in a distributed system comprising the steps of:

generating an initial multi-category QoS specification representative of probabilistic estimates of QoS levels available via said server based on preferences by a server application;

filtering said initial multi-category QoS specification according to capabilities of resources of said distributed system to support QoS levels, said filtering producing a plurality of multi-category QoS specifications, each category of said multi-category QoS specifications being representative of a parameter of said multi-category QoS specification;

transmitting said plurality of multi-category QoS specifications to a client agent in response to a request via a communications link;

upon receiving said plurality of multi-category QoS specifications at said client agent, calculating an expected utility at said client agent for each of said plurality of multi-category QoS specifications based on said probability estimates of said QoS levels;

formulating an offer including at least one of said multi-category QoS specifications in response to said calculations of expected utilities;

identifying said offer to a server agent; and upon receiving said offer at said server agent, determining whether to accept said offer, including utilizing a first trust function that is representative of a level of trust said server agent possesses with regard to said client agent based on an extent to which QoS agreements negotiated by said client agent have been satisfactorily performed previously, said calculating step including utilizing a second trust function in calculating said expected utility of said multi-category QoS specification, said second trust function being representative of a level of trust said client agent possesses with regard to said server agent based on an extent to which QoS agreements negotiated by said server agent have been satisfactorily performed previously.

18. The method of claim 17 wherein said determining step includes ranking said at least one selected multi-category QoS specification according to an expected utility to said server of each of said at least one selected multi-category QoS specification in said offer.

19. The method of claim 17 wherein said filtering step includes producing said plurality of multi-category QoS specifications such that each multi-category QoS specification includes a client behavior mode with a probabilistic estimate of client behavior.

* * * * *